Aug. 18, 1925.  1,550,158
V. L. J. GINN ET AL
APPARATUS FOR INTERMITTENTLY DISPLAYING AND ILLUMINATING ADVERTISING SIGNS
Filed July 12, 1922   2 Sheets-Sheet 2

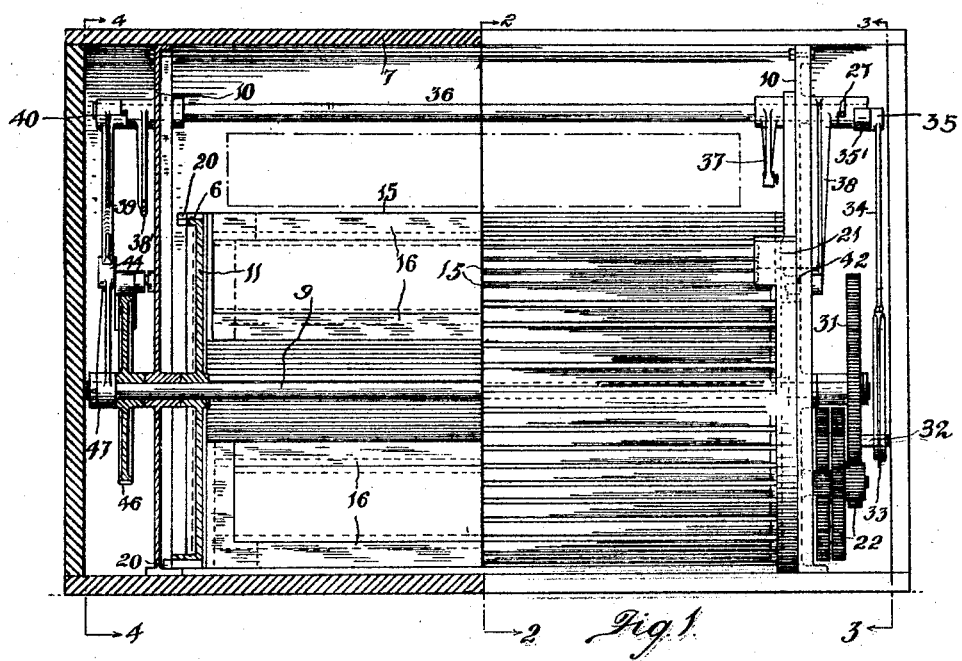

Inventor
V.L.J. Ginn
R.T.M. Murray
By Marks & Clerk
Attorneys

Patented Aug. 18, 1925.

1,550,158

UNITED STATES PATENT OFFICE.

VICTOR LEWIS JAMES GINN AND RAYMOND THOMAS MAYNARD MURRAY, OF CAULFIELD EAST, VICTORIA, AUSTRALIA.

APPARATUS FOR INTERMITTENTLY DISPLAYING AND ILLUMINATING ADVERTISING SIGNS.

Application filed July 12, 1922. Serial No. 574,481.

*To all whom it may concern:*

Be it known that VICTOR LEWIS JAMES GINN, of 152 Tooronga Road, Caulfield East, and RAYMOND THOMAS MAYNARD MURRAY, of 83 Finch Street, Caulfield East, both in the State of Victoria, Commonwealth of Australia, subjects of the King of Great Britain, have invented certain new and useful Improvements in Apparatus for Intermittently Displaying and Illuminating Advertising Signs; and we do hereby declare the following to be a full, clear, and exact description of the invention, such as will enable others skilled in the art to which it appertains to make and use the same.

This invention relates to improvements in apparatus for intermittently displaying and illuminating advertising signs and the like and refers especially to apparatus wherein a series of transparent or partially transparent slides having advertising or other matter written, printed or otherwise delineated thereon are successively displayed and illuminated by a flash light.

The object of the invention is to provide a simple and compact apparatus which can be employed to successively display a number of separate advertisements, pictures or the like for short periods in such a way as to attract the attention of persons in the vicinity.

We accomplish the above mentioned object by providing an intermittently rotatable magazine having a plurality of tangentially or radially disposed guides or pockets accommodating transparent or opaque slides having opaque or transparent printing or designs respectively thereon and in furnishing means for lifting one slide at a time and exposing the same before an intermittently illuminated lamp or lamps and then returning the slide to its respective guide or pocket during a stationary period of the magazine and for partially rotating the said magazine to bring it into position for enabling the next succeeding slide to be exposed.

The magazine is rotated and the devices for raising the slides from and returning them to the magazine are operated from the spindle of an electric motor or other suitable source of power which may be housed in the casing of the apparatus or located on the outside thereof.

A salient feature of the invention resides in the employment of a rotary magazine having tangentially or radially disposed guides or pockets for supporting a plurality of slides and in providing means whereby the slides may be successively raised and exposed before an intermittently illuminated lamp and then lowered to their respective pockets and in the following specification we have disclosed and in the annexed sheets of drawings we have illustrated one practical embodiment of the invention.

In order that the invention may be readily understood reference will now be had to the accompanying sheets of drawings wherein Figure 1 is a view of an apparatus constructed in accordance with the present invention. One half of this view shows a front longitudinal section taken on the dotted line 1—1, and the other half a front elevation with the front wall removed and viewed from the line 1'—1' of Figure 3.

Figure 2 is a view in sectional side elevation of the apparatus taken on the dotted line 2—2 of Figure 1 with some of the slides broken away to indicate the recesses in the discs.

Figure 3 is a view in sectional side elevation taken on the dotted line 3—3 of Figure 1.

Figure 4:
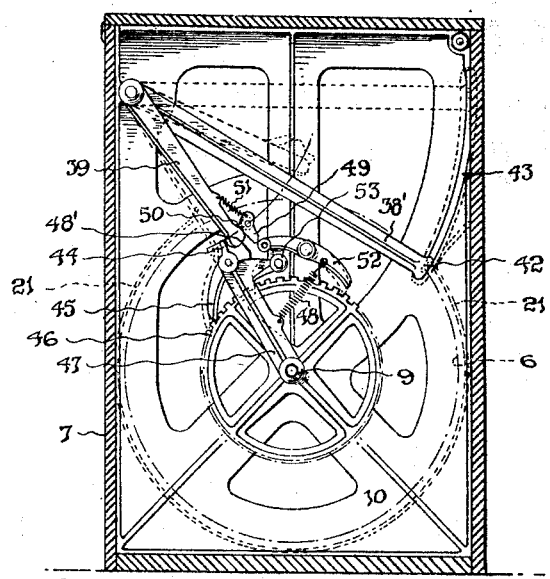
Figure 4 is a view in sectional side elevation taken on the dotted line 4—4 of Figure 1.

In these drawings the reference numeral 6 designates the rotatable magazine which together with the operative parts of the apparatus are housed in a suitable casing 7 having a sight opening or window 8 in the front thereof of suitable dimension and shape.

The rotary magazine 6 is mounted on a spindle 9 supported by brackets or frames 10 in the casing and comprises end discs 11 having notches 12 in the peripheries and tangentially disposed wings or flanges 13 on the inner sides thereof.

The wings or flanges 13 are disposed between the notches 12 in the peripheries of the discs and are adapted to form guides or pockets 14 for receiving the side edges of the slides 15 upon which the advertising matter is delineated. These slides may be formed of metal frames in which are removably supported sheets of more or less transparent material having opaque letters or devices formed thereon in any suitable way.

Figure 5:
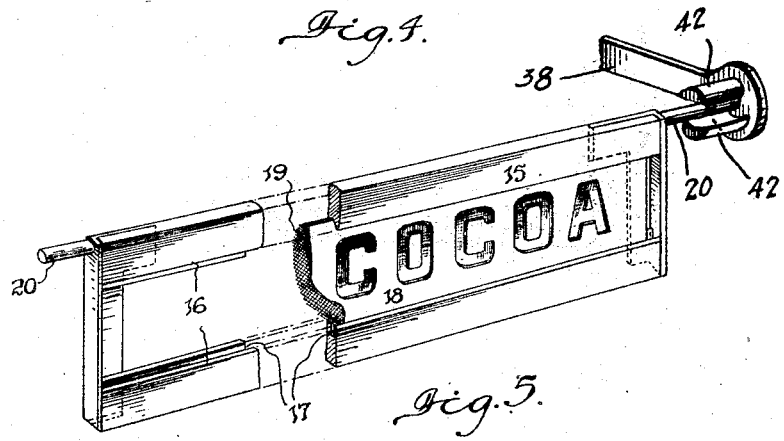
Figure 5 is a view in perspective of a slide showing a part broken away for convenience of illustration and also showing a portion of one of the slide lifting members with one of the jaws thereon.

The preferred form of slide is shown in Figure 5 of the drawings and comprises an open frame 16 having side pieces of wood and end pieces of metal or other suitable material provided with grooves 17 into which are sprung the edges of the opaque sheet 18. In Fig. 5, only a part of the opaque sheet is shown, the word "cocoa" being stamped therefrom. The opaque sheet can be formed of metal, cardboard or other suitable material and when the sheet is made from fragile material it can be strengthened by a backing 19 of gauze or other similar semi-transparent material as shown. In lieu of using a backing of semi-transparent material the said backing can be made of glass, celluloid, mica, or other transparent material.

It will be obvious that the "backing" or reinforcing material can be applied to the front of the sheets carrying the display matter and that the display matter can be applied to transparent sheets (such as glass) in one or more colors and the backing can be dispensed with when the sheets are made of sufficiently strong material.

For convenience in inserting the display sheets in the frames of the slides the lips on one side of the grooves 17 are made shorter than the lips on the opposite sides of the said frame, as shown in Figure 5.

The upper corners of the frames of the slides are provided with laterally projecting trunnions 20 which are adapted to pass into and project beyond the notches 12 in the end plates of the magazine and the slides are retained correctly within the guides or pockets 14 by means of circumferential guide plates or fences 21 which pass almost entirely around the end discs of the magazine. The said guide plates or fences can be formed integrally with or fitted to the frames 10.

The upper portions of the end discs are not covered by the said guide plates or fences 21 and therefore the slides may be readily removed from the guides or pockets at this point when it is desired to substitute one or more for another or others.

The magazine is intermittently operated through suitable reduction gearing 22 and ratchet mechanism from the spindle of an electric motor or other convenient source of power located within or adjacent to the casing of the apparatus (not shown). The gearing 22 imparts motion to a gear wheel 31 rotatably mounted on the spindle carrying the magazine.

The gear wheel 31 is located on one end of the spindle 9 and is fitted with a crank pin 32 which is engaged by a lost motion link 33 adjustably connected to a rod 34 pivoted to an arm 35 fitted to one end of a rock shaft 36 passing transversely through the upper part of the apparatus.

The arm 35 is formed with a boss 35' at the inner end thereof and is secured to the rock shaft 36 thereby, the boss 35' having a loose dog clutch engagement 37 at the boss of a forwardly projecting lever 38 which in turn is loosely mounted on the rock shaft.

A forwardly projecting lever 38' is mounted on the rock shaft near the opposite end thereof and the two levers 38 and 38' are adapted to swing up and down or oscillate on the outside of the frames 10.

The opposite end of the rock shaft to that fitted with the arm 35 is fitted with a downwardly inclining arm 39 and a boss on the said arm 39 has a loose clutch engagement (as at 40) with the boss of the adjacent lever 38'

The outer ends of the levers 38 and 38' are formed with laterally projecting jaws 42 which are adapted to pass through and move freely in arcuate slots 43 formed in the frames 10 when the rock shaft is actuated by the rotation of the gear wheel 31.

The arm 39 moves downwardly with the levers 38 and 38' and when approaching the limit of its movement it strikes against an extension 44 of an arm 47 carrying a pawl 45 which normally engages with the teeth of a ratchet or toothed wheel 46 fitted to the spindle 9.

The pawl 45 is pivoted to the free end of the arm 47 which is pivotally mounted on one end of the spindle 9 and is retained in its normal position by means of a spring 48.

An abutment 48' on the arm 47 and a stop on the adjacent frame 10 correctly determine the normal position of the said arm. The spring 48 likewise returns the arm to its normal position prior to the levers 38 and 38' commencing to return to their raised positions.

Each movement of the arm 47 causes the ratchet wheel 46 and the magazine to be rotated sufficiently to bring a fresh slide in line with the arcuate slots 43 and the pins thereon between the jaws on the ends of the levers 38 and 38'.

The free end of the arm 39 is provided with a lug to which is pivoted a trip tappet 49 which is retained in its operative position and bearing against a stop 50 by means of a spring 51. The operative end of the said trip tappet is adapted to come into contact with and depress an extension on a locking pawl 52 so as to disengage the locking end thereof from the teeth of the ratchet wheel 46. The trip tappet is so arranged that it will cause the pawl 52 to be disengaged from the ratchet wheel just prior to the arm 39 coming into contact with and operating the pawl carrying arm 47 and the said tappet will keep the pawl out of engagement with the said ratchet wheel until the latter has been rotated sufficiently to enable the said pawl to engage the next oncoming tooth.

The first mentioned locking pawl 52 is released prior to the pawl 45 on the pivoted arm 47 engaging with the tooth on the ratchet wheel and the said locking pawl 52 is returned to its operative position in time to engage the next oncoming tooth of the ratchet wheel thereby positively ensuring a predetermined movement of the magazine at each rotation of the crank pin.

When the arm 39 is moving on its return stroke the trip tappet will be depressed when it contacts with the extension on the pawl 52 and will pass freely thereover without actuating the same.

The gravity pawl 53 prevents forward movement of the ratchet wheel 46.

The pawl 52 locks the ratchet wheel 46 against rearward movement and this pawl together with the locking pawl 53 prevents any movement of the said wheel during the exposure of a slide.

The first mentioned locking pawl 52 is kept in engagement with the ratchet wheel 46 by means of the spring 48 which is connected at one end to a stud on the pawl and at the other end to the pivoted arm 47 as shown in Figure 4.

The movement of the levers 38 and 38' is sufficient to raise a display slide from its pocket in the magazine to a point behind the window 8 and in advance of an intermittently illuminated lamp or lamps 55 furnished with a reflector 56.

The arrangement of the connection between the crank pin 32 and the arm 35 and the dog clutch engagements between the levers 38 and 38' and the arms 35 and 39 is such that when the levers have been lowered sufficiently to place the display slides in the magazine the arm 39 has just reached its operative position and the looseness or "play" in the dog clutches enables the said arm 39 to be moved further to release the locking pawl 52 and impart a partial rotation to the said magazine.

The levers 38 and 38' remain in their lowered position during the partial rotation of the magazine and when the crank pin 32 has moved beyond the limit of its working stroke the said levers are free to rise under the influence of a spring 54 and carry a fresh display slide behind the window 8. The spring 54 is connected at one end to a frame 10 and at the other end to an arm 57 fitted to the rock shaft 36.

The lamp is illuminated when the levers reach their uppermost position due to the closing of a switch 58 arranged in the lamp circuit.

The switch consists of a spring contact piece 59 fitted to a block of insulated material carried by one of the levers and a pair of spring blades 60 fitted to one of the frames 10 and connected to the wires of the lamp circuit. The lamp circuit is opened when the contact piece is removed from the blades by the initial downward movement of the levers and is closed by the contact piece bridging the spring blades 60 when the levers return to their raised positions.

While we have described in the foregoing specification the preferred forms of construction and combination and arrangement of parts we are aware that various alterations and modifications may be made therein without departing from the spirit and scope of the invention and we therefore do not wish to be understood as limiting ourselves by the positive terms employed in the description.

We claim:—

1. An apparatus for intermittently displaying signs and the like comprising a main casing having a sight opening, a frame in the casing the end pieces of which are provided with arcuate slots, a main shaft journalled in the end pieces of the frame, a magazine rotatably mounted in the frame and provided with a series of tangentially disposed guide ways, a plurality of display slides, opposed trunnions on the outer ends of the slides projecting partially beyond the end edges of the magazine, an oscillatory shaft in the upper part of the casing having its ends journalled in the end portions of the frame, means located in one end of the casing and between the main rotatable shaft and the oscillating shaft for effecting an oscillatory movement of the latter shaft, means located in the other end of the casing and arranged between the two shafts for effecting an intermittent rotation of the main shaft and the magazine, and mechanism for successively removing the display slides and exposing them rearwardly of the sight opening and then returning them to the magazine during the stationary periods of the magazine including levers operatively connected to the oscillatory shaft and clamping jaws on the outer ends of said oscillatory levers projecting through the slots in the end pieces of the frame for successively engaging the projecting trunnions of the display slides.

2. An apparatus as claimed in claim 1 wherein the magazine comprises discs having notched edges and a circular series of tangentially disposed laterally extending flanges on the adjacent inner faces for receiving the main portions of the slides when the trunnions thereof are disposed in the notches, and circular retaining members arranged in closely spaced relation about the sides and under portions of the magazine for preventing accidental displacement of the slides during rotation of the magazine yet leaving the upper slides exposed so that they may be successively removed at predetermined periods.

3. An apparatus for intermittently displaying and illuminating signs and the like comprising a main casing having a sight opening, a lamp in the casing rearwardly of the opening, a frame in the casing, a main rotatable shaft journalled in the end pieces of the frame, a magazine carried by the main shaft and positioned between the end pieces of the frame, a plurality of display slides removably supported in the magazine, an oscillatory shaft journalled in the ends of the frame near the upper part of the casing, mechanism located near one end of the casing and operably connecting the main and oscillating shaft for transmitting an oscillatory movement to the latter shaft from the main shaft, means located in the other end of the casing and operatively arranged between the two shafts for effecting an intermittent rotation of the main shaft, and a pair of levers carried by the oscillatory shaft and having their free ends arranged through the end pieces of the frame for successively engaging the ends of the display slides for successively lifting the slides in the magazine and arranging them between the sight opening and the lamp and returning them to the magazine during stationary periods of the magazine.

4. In apparatus for intermittently displaying and illuminating signs and the like as claimed in claim 3 a pair of levers loosely mounted on the rock shaft, a pair of arms fitted rigidly to the rock shaft, loose dog clutch engagements between the arms and the levers, and an arm on the rock shaft connected by a spring to the frame of the apparatus.

5. In apparatus for intermittently displaying and illuminating signs and the like as claimed in claim 3 a ratchet wheel on the spindle supporting the magazine, a locking pawl engaging the teeth of the ratchet wheel, a pivoted arm carrying a pawl engaging the ratchet wheel, and an oscillating arm carrying a trip tappet adapted to disengage the locking pawl prior to the oscillating arm coming into contact with and operating the pawl carrying arm to partially rotate the magazine.

6. In display apparatus as claimed in claim 3 a gear wheel on the spindle supporting the magazine having a crank pin fitted thereto, a lost motion link connection between the crank pin and an arm fitted to the rock shaft, a loose dog clutch engagement between the arm and one of the levers, an arm fitted to the rock shaft adjacent to the second lever, a loose dog clutch engagement between the second lever and the adjacent arm, a spring controlled trip tappet on the second arm, a ratchet wheel on the magazine, a spring controlled arm pivoted in line with the axis of the ratchet wheel, a pawl on the free end of the pivoted arm, and pawls for locking the ratchet wheel and magazine against movement until the pivoted arm is actuated.

In testimony that we claim the foregoing as our invention we have signed our names.

VICTOR LEWIS JAMES GINN.
RAYMOND THOMAS MAYNARD MURRAY.